United States Patent [19]

Schneider

[11] Patent Number: 5,099,760

[45] Date of Patent: Mar. 31, 1992

[54] APPARATUS FOR EFFECTING A RAPID ADJUSTMENT OF MACHINE MEMBERS OR THE LIKE

[75] Inventor: Horst Schneider, Lengerich, Fed. Rep. of Germany

[73] Assignee: Windmöller & Hölscher, Lengerich, Fed. Rep. of Germany

[21] Appl. No.: 647,024

[22] Filed: Jan. 29, 1991

[30] Foreign Application Priority Data

Feb. 22, 1990 [DE] Fed. Rep. of Germany ....... 4005681

[51] Int. Cl.⁵ ...................... B41F 31/00; F16H 27/02
[52] U.S. Cl. .................................. 101/351; 101/352; 101/357; 101/358; 101/361; 101/362; 74/89.14; 74/27; 74/426; 74/500
[58] Field of Search ............... 101/351, 352, 357, 358, 101/361, 362; 74/27, 89.14, 426, 500

[56] References Cited

U.S. PATENT DOCUMENTS

| | | | |
|---|---|---|---|
| 3,628,386 | 12/1971 | Blum | 74/89.14 |
| 4,130,057 | 12/1978 | List | 101/148 |
| 4,138,944 | 2/1979 | Biggar, III | 101/247 |
| 4,362,098 | 12/1982 | Sterling, Jr. | 101/219 |
| 4,458,591 | 7/1984 | Guaraldi | 101/247 |
| 4,676,156 | 6/1987 | Aylor | 101/148 |
| 4,919,047 | 4/1990 | Inouye | 101/175 |

FOREIGN PATENT DOCUMENTS 1013664 8/1957 Fed. Rep. of Germany ..... 74/89.14

*Primary Examiner*—Edgar S. Burr
*Assistant Examiner*—Eric Raciti
*Attorney, Agent, or Firm*—Fleit, Jacobson, Cohn, Price, Holman & Stern

[57] ABSTRACT

Apparatus for affecting positional adjustment of a machine member has an adjustment screw nonrotatably connected to the machine member and screwed into a nut formed as a worm wheel. The worm wheel, meshes with a worm, connected by a worm shaft to an actuator assembly for rotating the worm. The worm shaft is rotatably and axially displaceably mounted in a housing in which the worm wheel is rotatably mounted and the worm shaft is rotatably and axially non-displaceably mounted in a slider, which is guided in the housing for movement in the axial direction of the worm shaft. The slider is reciprocable by a fluid-operable piston-cylinder unit to an extent which corresponds to the desired adjustment of the screw.

4 Claims, 2 Drawing Sheets

APPARATUS FOR EFFECTING A RAPID ADJUSTMENT OF MACHINE MEMBERS OR THE LIKE

BACKGROUND OF THE INVENTION

1. FIELD OF THE INVENTION

This invention relates to an apparatus for effecting a rapid adjustment of machine members or the like, such as in a printing press for effecting a rapid adjustment of a plate cylinder, which is engageable with an impression cylinder, and/or an inking roller, engageable with a plate cylinder. The apparatus is of the type comprising a screw, which is nonrotatably connected to the machine member that is to be adjusted or to the machine frame and is screwed into a nut, which is rotatably and axially displaceably mounted in the machine frame or in the machine member that is to be adjusted and consists of a worm wheel, which meshes with a worm, connected by a worm shaft to actuating means for rotating said worm.

2. DESCRIPTION OF THE PRIOR ART

Apparatus of the above kind in which the actuating means preferably consists of a hand wheel, is known and may be used, e.g., to move a plate cylinder into engagement with an impression cylinder and/or to engage an inking roller with a plate cylinder in that the worm is rotated to rotate a shaft carrying the worm. Only slow adjusting movements can be effected by manual rotation of the worm shaft and this requires relatively troublesome manipulations.

SUMMARY OF THE INVENTION

It is an object of the invention to provide an apparatus which can easily be used to effect a rapid adjustment of machine members.

In accordance with the invention, the worm shaft is rotatably and axially displaceably mounted in a housing or housing part in which the worm wheel is rotatably mounted and the worm shaft is rotatably and axially nondisplaceably mounted in a slider, which is guided in or on the housing for movement in the axial direction of the worm shaft, and which is reciprocable by an fluid-operable piston-cylinder unit to an extent which corresponds to the extent of the desired adjustment of the screw. The worm, which is carried by the worm shaft, virtually constitutes a rack, which is driven to perform a reciprocating motion so as to impart to the worm wheel a rotation which then effects the desired axial adjustment of the screw screwed in the worm wheel. If the rapid adjusting apparatus in accordance with the invention is used to adjust plate cylinders and/or inking rollers, said cylinders or rollers may be caused by said apparatus to perform a short movement to and from a printing position. In the rapid adjusting apparatus in accordance with the invention, an adjustment can still be effected wherein the worm shaft is rotated by hand or by a motor to effect fine adjustments or larger adjustments.

The range of displacement of the slider is suitably limited by stops so that displacements over the same distance will always be effected by the rapid adjustment effected by the fluid-operable piston cylinder unit.

In accordance with a preferred feature of the invention, the slider is provided with means for braking the worm shaft, which is movably mounted in the slider. Such braking means is particularly desirable if there is no self-locking action between the worm and the worm wheel. A braking force will be selected such that the worm shaft can be rotated as desired but a self-locking action will be ensured when the worm shaft is adjusted by the fluid-operable piston-cylinder unit. A suitable self-locking action or an additional braking action will ensure that the worm acts virtually as a rack but will not be rotated owing to the lead of the convolutions of the worm, because such rotation might result in an uncontrollable change of the extent of the displacement effected by the rapid adjustment.

In accordance with a further preferred feature two parallel screws are mounted in a housing, which is connected to a carriage, which carries a plate cylinder and which is longitudinally slidably mounted on and guided by a bracket or the like of a printing press. One of said screws is fixed to the bracket or the like and the other screw is fixed to an inking roller carriage which is longitudinally slidably mounted on and guided by the carriage for the plate cylinder.

DETAILED DESCRIPTION OF THE PREFERRED EMBODIMENT

Figure 1:
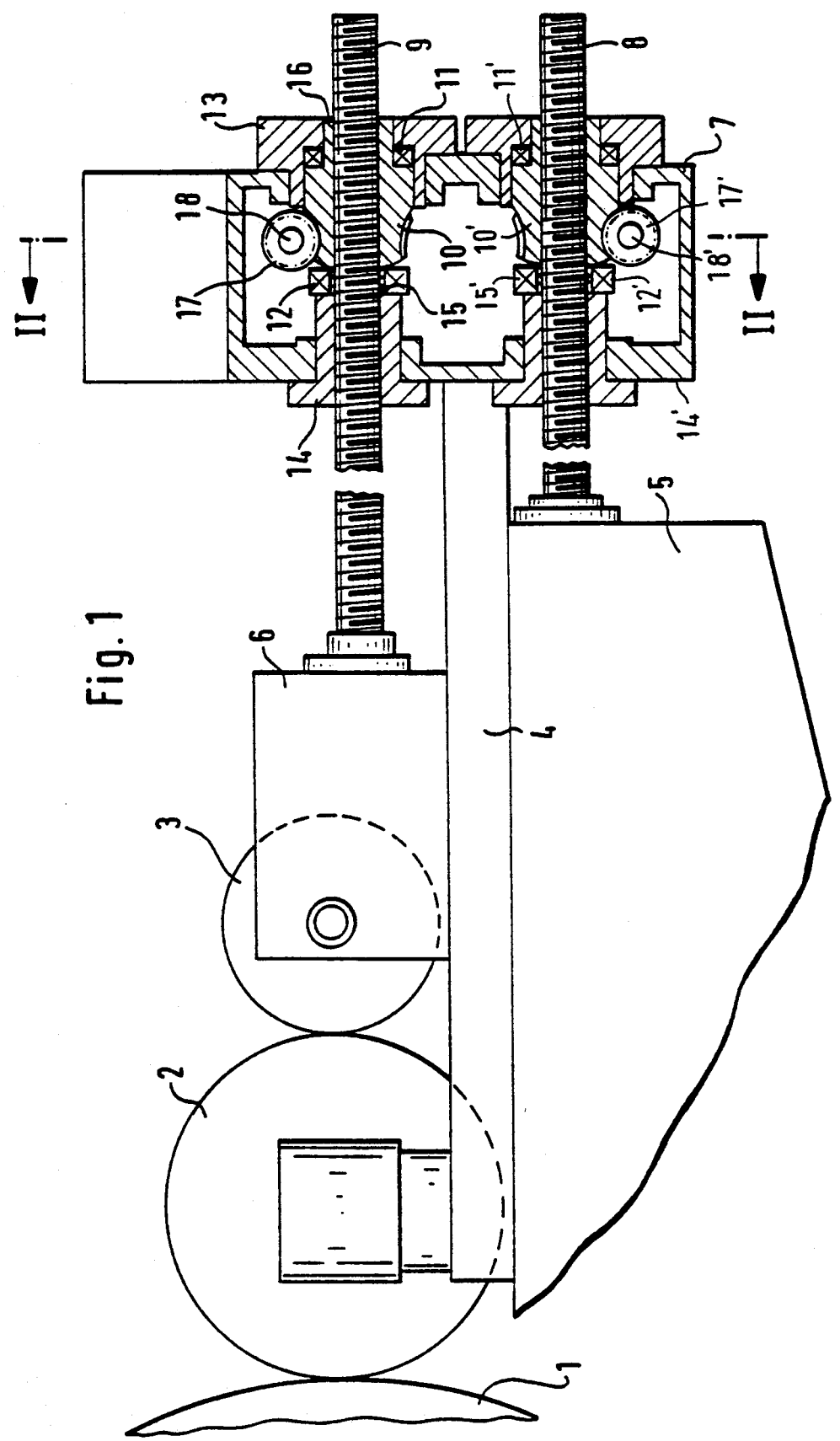
FIG. 1 is a side elevation showing carriage guides for a plate cylinder, which is engageable with an impression cylinder, and for an inking roller, which is engageable with the plate cylinder, and also showing screw drives for adjusting the carriages for the plate cylinder and the inking roller.

FIG. 1 shows a portion of an impression cylinder 1, e.g., of a flexographic printing press and a plate cylinder 2, which is engageable with the impression cylinder. An inking roller 3 is engageable with the plate cylinder 2. The plate cylinder and the inking roller 3 are movable independently of each other or in unison by a carriage 4 and a bearing bracket 6 which carry the cylinder 2 and the roller 3, respectively.

The plate cylinder 2 rests on the carriage 4, displaceably mounted on and guided by a bracket 5, which is fixed to the frame of the press. The bearing bracket 6 is mounted on the carriage 4, carries the inking roller 3, and is also displaceably mounted on and guided by the carriage 4. A housing 7 is fixed to the carriage 4 and two screws 8 and 9 extend at least in part through the housing 7. The screw 8 is fixed at its left-hand end to the bracket 5, which is fixed to the frame of the press. The screw 9 is fixed at its left-hand end to the bearing bracket 6. The two screws 8 and 9 are similarly mounted in the housing 7, and therefore, only the mounting of the top screw 9 will be described further.

A worm wheel 10 is mounted within the housing 7 on the screw 9 and has female screw threads, which mesh with the male screw threads of the screw 9. Bearings 11 and 12 are provided o opposite sides of the worm wheel 10. The bearing 11 bears against an end plate 13, and the bearing 12 bears against an end plate 14, which is opposite to the end plate 13. The bearing 12 is mounted on a projection 15 of the end plate 14 and the bearing 11 is mounted on a projection 16 of the worm wheel 10. The worm wheel 10 meshes on the outside with a worm 17, fixed to a shaft 18, which protrudes at both ends out of the housing 7. A hand wheel 19 is fixed to that the of the shaft 18 which is shown on the left in FIG. 2. That end of the shaft 18 which protrudes from the housing 7 on the right in FIG. 2 extends into another housing 20, which is fixed to the housing 7 by a connecting flange 21.

That end portion of the shaft 18 which protrudes into the housing 20 includes a stepped-down portion 22, on which bearings 23 are mounted. The bearings bear at one end on a collar 24 and at the other end on a clamp ring 25, which is fixed by a screw 26 on the stepped-down portion 22 of the shaft 18. The bearings 23 are held by an interference fit in the bore of a coupling element 27, which is fixed to a piston rod 28 of a piston-cylinder unit 29. Unit 29 is fixed by screws to the housing 20, which has a through bore for the piston rod 28. The housing 20 is covered at the top by a cover 30, which is provided with a projection 32, against which the coupling element 27 is held by the piston-cylinder unit 29. The left-hand stop for the coupling element 27 is constituted by the inside surface of the wall 32' of the housing 20. For imparting to the inking roller 3 a movement away from and toward the plate cylinder 2, the piston-cylinder unit 29 is operated so that the shaft 18 moves in the direction indicated by the arrow A and when viewed in FIG. 2 the shaft 18 will then move to the left until the coupling element 27 engages the wall 32' of the housing 20 and the worm 17 is in the position indicated in phantom. Before that position has been reached the worm wheel 10 has performed a predetermined angular movement in the counterclockwise sense and has displaced the screw 9 to a certain extent because the female screw threads of the worm wheel 10 mesh with the male screw threads of the screw 9. The hand lever 19 is then used only for a fine adjustment. To ensure nevertheless that the worm 17 will not revolve on the worm wheel 10 but will rotate the latter during the axial movement of the shaft 18, a brake cup 33 is mounted on the stepped down right-hand portion of the shaft 18 and an annular surface of said cup 33 bears on the coupling element 27. The brake cup 33 is nonrotatably connected to the stepped-down portion 22 by a feather key 34. The pressure force applied by the brake cup 33 to the coupling element 27 is controlled by a compression spring 35, which can be more or less prestressed by a nut 36. The nut 36 is screwed on screw threads, not shown, and which are formed at the right-hand end of the stepped-down portion 22.

Figure 2:
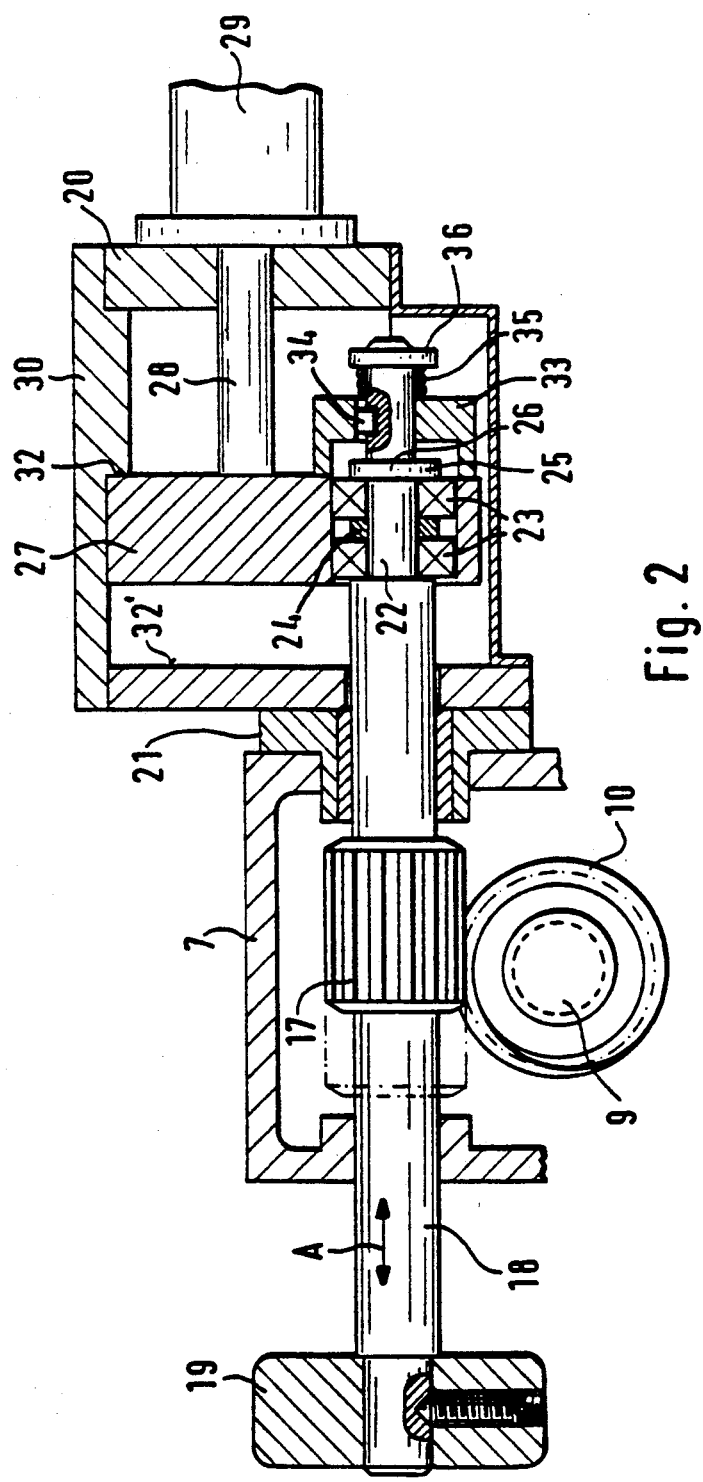
FIG. 2 is a sectional view on line II—II in FIG. 1 and showing the top half of a housing and the means for driving the screws.

The mechanism shown in FIG. 2 serves to adjust the screw 9. Those parts by which the screw 8 is adjusted are not shown in FIG. 2, but are equivalent to and disposed under the parts shown in FIG. 2 and their description will not be repeated. The parts for rotating screw 8 which are shown in FIG. 1 have the same references as the equivalent parts for screw 9 but are primed.

The carriage 4 for the plate cylinder 2 and the carriage or bearing bracket 6 for the inking roller 3 can each be adjusted in that the worm shaft 18 or 18' is rotated by the associated hand wheel 19 or an equivalent wheel, not shown, for shaft 18'.

The apparatus in accordance with the invention may be adjusted by an alteration of screw drives which are operable only by a hand wheel. For such alteration it is sufficient to mount the existing screw shafts 18, 18' in the housing 7 for axial displacement and to flange to the housing 7 the housing 20 of the apparatus for effecting rapid adjustment.

What is claimed as new is as follows:

1. Apparatus for affecting positional adjustment of a first machine member with respect to a second machine member comprising:
   a housing;
   an adjustment screw nonrotatably connected to a machine member;
   a nut formed as a worm wheel;
   a worm, said worm meshing with said worm wheel;
   actuating means for rotating the worm;
   a worm shaft, said worm shaft operatively connecting said worm to said actuating means;
   displacement means rotating and axially displacing said worm shaft with respect to said housing;
   a slider, said worm shaft being mounted in said slider;
   a fluid operable piston-cylinder operatively connected to said slider;
   guide means for restricting the motion of said slider to an axial direction of the worm shaft when said slider is subject to force imparted by said fluid operable piston-cylinder to an extent limited by said actuating means.

2. Apparatus according to claim 1, said guide means further including stops for limiting the range of displacement of the slider.

3. Apparatus according to claim 1, further comprising means movably mounted on the slider for braking the worm shaft.

4. Apparatus according to claim 1, wherein the machine member is a carriage of an inking roller on a printing press for engaging a plate cylinder which in turn engages an impression cylinder of the press and wherein the plate cylinder is mounted on an adjustment carriage, further comprising:
   a second adjustment screw nonrotatably connected to the plate cylinder adjustment carriage;
   a second nut formed as a worm wheel;
   second actuating means for rotating for second worm;
   a second worm shaft, said second worm shaft operatively connecting said second worm to said second actuating means;
   second displacement means rotating and axially displacing said second worm shaft with respect to said housing;
   a second slider, said second worm shaft being mounted in said second slider;
   a second fluid operable piston-cylinder operatively connected to said second slider;
   second guide means for restricting the motion of said slider to an axial direction of the worm shaft when said slider is subject to force imparted by said fluid operable piston-cylinder to an extent limited by said actuating means.

* * * * *